United States Patent
Long et al.

(10) Patent No.: US 11,231,519 B2
(45) Date of Patent: Jan. 25, 2022

(54) METHOD AND DEVICE FOR SIMULATING DISCHARGE, AND COMPUTER DEVICE

(71) Applicant: Tsinghua University, Beijing (CN)

(72) Inventors: Di Long, Beijing (CN); Qi Huang, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 211 days.

(21) Appl. No.: 16/686,199

(22) Filed: Nov. 17, 2019

(65) Prior Publication Data
US 2021/0048557 A1 Feb. 18, 2021

(30) Foreign Application Priority Data
Aug. 15, 2019 (CN) .................... 201910753987.7

(51) Int. Cl.
*G01V 99/00* (2009.01)
*G06F 30/20* (2020.01)
*G06F 111/10* (2020.01)

(52) U.S. Cl.
CPC ............ *G01V 99/005* (2013.01); *G06F 30/20* (2020.01); *G06F 2111/10* (2020.01)

(58) Field of Classification Search
CPC ............ G01V 99/005; G01V 2210/661; G06F 30/20; G06F 2111/10; G06F 30/28; G06F 2113/08; G06Q 10/04; G06T 7/12; G06T 7/62; G06T 2207/10032; G06T 2207/30181
See application file for complete search history.

(56) References Cited

U.S. PATENT DOCUMENTS

2018/0059284 A1 3/2018 Yan et al.
2019/0251215 A1* 8/2019 Linares .................... B64G 3/00

FOREIGN PATENT DOCUMENTS

| CN | 106599571 | 4/2017 |
| CN | 108470221 | 8/2018 |
| CN | 108614915 | 10/2018 |
| CN | 108647454 | 10/2018 |
| CN | 109035105 | 12/2018 |

OTHER PUBLICATIONS

Wei Haohan et al: "Terrestrial water storage variations in Southwest China revealed by gravity mission and hydrologic and climate model", Journal of Hohai University(Natural Sciences), vol. 41 No. 6, Nov. 30, 2013, pp. 488-492.
Ma Jin et al: "Research of river discharge estimation model based on remote sensing in lack of hydrological data area", Science of Surveying and Mapping, vol. 44, No. 5, May 31, 2019, pp. 184-190.

* cited by examiner

*Primary Examiner* — Bijan Mapar (57) ABSTRACT

The present disclosure relates to a method and a device for simulating discharge, and a computer device. The method includes steps of: acquiring forcing data; simulating the discharge of a river basin to be measured according to the forcing data and a calibrated hydrological model of the river basin, to obtain a simulated discharge of the river basin; the calibrated hydrological model is a hydrological model including calibrated model parameters; the calibrated model parameters are obtained by calibrating model parameters of an initial hydrological model, according to a converted discharge of the river basin to be measured and the GRACE-derived total water storage changes of the river basin to be measured.

17 Claims, 5 Drawing Sheets

Inputting the forcing data into multiple calibrated hydrological models corresponding to multiple sets of calibrated model parameters, to obtain multiple parameter-simulated discharges; wherein, each set of calibrated model parameters correspond to a parameter-simulated discharge — S801

Acquiring an average value of the multiple parameter-simulated discharges, and regarding the average value of the multiple parameter-simulated discharges as the simulated discharge — S802

FIG.1

```
┌─────────────────────────────────────────────┐
│  Acquiring the converted discharge of the   │
│  river basin to be measured through the     │
│  remote sensing satellite, wherein the      │
│  converted discharge of the river basin to  │
│  be measured is converted according to the  │
│  river width measured by the remote sensing │──S201
│  satellite in different time periods; a     │
│  relationship of the river width and the    │
│  converted discharge is characterized by a  │
│  River Width - Discharge converting         │
│  function, and the River Width - Discharge  │
│  converting function is established based   │
│  on a Water Depth - River Width converting  │
│  function and a Water Depth - Discharge     │
│  converting function                        │
└─────────────────────────────────────────────┘
                      │
                      ▼
┌─────────────────────────────────────────────┐
│  Acquiring the GRACE-derived total water    │──S202
│  storage changes of the river basin to be   │
│  measured through the gravity satellite     │
└─────────────────────────────────────────────┘
                      │
                      ▼
┌─────────────────────────────────────────────┐
│  Constructing objective functions, wherein  │──S203
│  the objective functions comprise a         │
│  discharge objective function between the   │
│  simulated discharge simulated by the       │
│  initial hydrological model and the         │
│  converted discharge, and a total water     │
│  storage objective function between a       │
│  simulated total water storage changes      │
│  simulated by the initial hydrological      │
│  model and the GRACE-derived total water    │
│  storage changes                            │
└─────────────────────────────────────────────┘
                      │
                      ▼
┌─────────────────────────────────────────────┐
│  Calibrating the model parameters of the    │──S204
│  initial hydrological model and calibrating │
│  function parameters of an initial River    │
│  Width - Discharge converting function      │
│  according to the objective functions, to   │
│  obtain the calibrated hydrological model   │
│  and a calibrated River Width - Discharge   │
│  converting function, wherein the           │
│  calibrated River Width - Discharge         │
│  converting function is the River Width -   │
│  Discharge converting function including    │
│  calibrated function parameters             │
└─────────────────────────────────────────────┘
```

METHOD AND DEVICE FOR SIMULATING DISCHARGE, AND COMPUTER DEVICE

CROSS-REFERENCE TO RELATED APPLICATION

This application claims all benefits accruing under 35 U.S.C. § 119 from China Patent Application No. 201910753987.7, filed on Aug. 15, 2019 in the China National Intellectual Property Administration, the content of which is hereby incorporated by reference.

TECHNICAL FIELD

The present application relates to the technical field of water conservancy, and in particular to a method and a device for simulating discharge, and a computer device.

BACKGROUND

River discharge is an important variable in the water cycle and is the basic data used for assessing surface water resources, monitoring global change and protecting ecological environment.

Currently, the method for simulating discharge is based on the calibrated hydrological model. The parameters of the calibrated hydrological model are calibrated according to the measured discharge data acquired by the gauging station. In practical applications, the construction of the gauging station is largely constrained by environmental conditions and has a high maintenance cost. In addition, due to economic and political influences in recent years, global gauging stations are gradually decreasing, and discharge data of international rivers are not shared among countries, so that available discharge data are relatively few.

Discharge simulation in areas with few data or no data of the gauged discharge, in the related technology, the hydrological models of other areas, such as adjacent river basins are used to simulate the discharge of the river basin to be measured. However, the characteristics of a river basin are often unique, and it is difficult to find exactly the same characteristics from other river basins. Therefore, the traditional discharge simulation of the river basin to be measured using the hydrological model of adjacent river basins has a great uncertainty, as the hydrological model of the adjacent river basins cannot represent the characteristics of the river basin to be measured.

SUMMARY

In one respect, the present application provides a method for simulating discharge, comprising:

acquiring forcing data, wherein the forcing data are configured to characterize climatic conditions of a river basin to be measured; and simulating the discharge of the river basin to be measured according to the forcing data and a calibrated hydrological model of the river basin to be measured, to obtain a simulated discharge of the river basin to be measured; wherein the calibrated hydrological model is a hydrological model including calibrated model parameters; the calibrated model parameters are obtained by calibrating model parameters of an initial hydrological model, according to a converted discharge of the river basin to be measured and a Gravity Recovery and Climate Experiment (GRACE)-derived total water storage changes of the river basin to be measured; the converted discharge of the river basin is obtained by a remote sensing satellite, and the GRACE-derived total water storage of the river basin is obtained by a gravity satellite; the converted discharge corresponds to a river width of the river basin to be measured.

In an embodiment, before simulating the discharge of the river basin to be measured according to the forcing data and the calibrated hydrological model of the river basin to be measured, to obtain the simulated discharge of the river basin to be measured, the method comprises:

acquiring the converted discharge of the river basin to be measured through the remote sensing satellite, wherein the converted discharge of the river basin to be measured is converted according to the river width measured by the remote sensing satellite in different time periods; a relationship of the river width and the converted discharge is characterized by a River Width-Discharge converting function, and the River Width-Discharge converting function is established based on a Water Depth-River Width converting function and a Water Depth-Discharge converting function;

acquiring the GRACE-derived total water storage changes of the river basin to be measured through the gravity satellite;

constructing objective functions, wherein the objective functions comprise a discharge objective function between the simulated discharge simulated by the initial hydrological model and the converted discharge, and a total water storage objective function between the simulated total water storage changes simulated by the initial hydrological model and the GRACE-derived total water storage changes; and calibrating the model parameters of the initial hydrological model and calibrating function parameters of an initial River Width-Discharge converting function according to the objective functions, to obtain the calibrated hydrological model and a calibrated River Width-Discharge converting function, the calibrated River Width-Discharge converting function is the River Width-Discharge converting function including calibrated function parameters.

In an embodiment, acquiring the converted discharge of the river basin to be measured through the remote sensing satellite, comprises:

obtaining a water body index of the river basin to be measured according to remotely-sensed images acquired by the remote sensing satellite;

binarizing the water body index, to obtain a binarized water body image of the river basin to be measured;

acquiring the river width of the river basin to be measured according to the binarized water body image; and obtaining the converted discharge based on the river width and the River Width-Discharge converting function.

In an embodiment, the GRACE-derived total water storage changes are the sum of changes in soil water storage, groundwater storage, glacial mass, and snow water equivalent of the river basin.

In an embodiment, the river width is an effective river width, and acquiring the river width of the river basin to be measured according to the binarized water body image comprises:

extracting a water body area and a river length from the binarized water body image; and obtaining the effective river width according to the water body area, the river length, and a water body area function; wherein the water body area function is a relational equation of the water body area, the river length, and the effective river width.

In an embodiment, the river width is an at-a-section river width, and acquiring the river width of the river basin to be measured according to the binarized water body image comprises:

converting the binarized water body image into a water body vector; and obtaining an average value of length of water body sections, according to the water body vector and a predetermined number of water body section vectors, and regarding the average value of the length of the water body sections as the at-a-section river width.

In an embodiment, obtaining the converted discharge based on the river width and the River Width-Discharge converting function comprises:

acquiring the initial River Width-Discharge converting function, wherein the initial River Width-Discharge converting function characterizes a relationship between the river width and the discharge; the initial River Width-Discharge converting function is a relational equation of the river width, the discharge, a first parameter, and a second parameter; the first parameter and the second parameter are the function parameters;

acquiring a first function, wherein the first function is a Water Depth-River Width converting function; the first function is a relational equation of a water depth, the river width, a maximum water depth, and a maximum river width of the river basin to be measured;

acquiring a second function, wherein the second function is a Water Depth-Discharge converting function; the second function is a relational equation of the water depth, the discharge, a third parameter, and a fourth parameter; the third parameter is in a third predetermined range, and the fourth parameter is in a fourth predetermined range;

establishing a third function based on the first function and the second function, wherein the third function is a relational equation of the river width, the discharge, the third parameter, and the fourth parameter;

calculating and getting a first range of the first parameter and a second range of the second parameter, according to the initial River Width-Discharge converting function, the third function, the third predetermined range of the third parameter, and the fourth predetermined range of the fourth parameter; and inputting the river width, the first parameter within the first range, and the second parameter within the second range into the River Width-Discharge converting function, to obtain the converted discharge corresponding to the river width.

In an embodiment, the GRACE-derived total water storage changes are a number of data measured by the gravity satellite in different time periods.

In an embodiment, the GRACE-derived total water storage changes are monthly total water storage changes measured by the gravity satellite in a preset time period.

In an embodiment, the GRACE-derived total water storage changes are anomaly series of the monthly GRACE-derived total water storage measured in the preset time period, and the acquiring the GRACE-derived total water storage changes of the river basin to be measured through the gravity satellite comprises:

acquiring the monthly GRACE-derived total water storage of the river basin to be measured in the preset time period through the gravity satellite;

obtaining an average monthly GRACE-derived total water storage in the preset time period from a sum of the monthly GRACE-derived total water storage divided by a number of months of the preset time period; and calculating differences between the monthly GRACE-derived total water storage and the monthly average GRACE-derived total water storage, to obtain an anomaly time series of the monthly GRACE-derived total water storage.

In an embodiment, the objective functions comprises a first equation of Nash-Sutcliffe efficiency coefficient between the simulated discharge and the converted discharge, a second equation of logarithmic Nash-Sutcliffe efficiency coefficient between the simulated discharge and the converted discharge, and a third equation of Pearson correlation coefficient between the simulated total water storage changes and the GRACE-derived total water storage changes.

In an embodiment, the Nash efficiency coefficient NSE, the logarithmic Nash efficiency coefficient NSE(log) and the Pearson correlation coefficient CC are calculated as follows:

$$NSE = 1 - \frac{(Q_e - Q_m)^2}{(Q_m - \overline{Q_m})^2}$$

$$NSE(\log) = 1 - \frac{(\log(Q_e) - \log(Q_m))^2}{(\log(Q_m) - \overline{\log(Q_m)})^2}$$

$$CC(T_{sim}, T_{obs}) = r(T_{sim}, T_{obs})$$

wherein, $Q_e$ is a simulated discharge; $Q_m$ is a converted discharge; $T_{sim}$ is a time series of the simulated total water storage changes simulated by the initial hydrological model in the preset time period; $T_{obs}$ is a time series of the GRACE-derived total water storage changes measured by the gravity satellite in the preset time period, and r characterizes an expression for calculating the Pearson correlation coefficient.

In an embodiment, the simulated discharge, the converted discharge, a logarithmic simulated discharge, and a logarithmic converted discharge are in forms of time series. The simulated total water storage changes and the GRACE-derived total water storage changes are all in forms of anomaly time series;

and the constructing the objective functions based on the time series and anomaly time series.

In an embodiment, the calibrating the model parameters of the initial hydrological model and calibrating the function parameters of the initial River Width-Discharge converting function according to the objective functions are based on an iterative algorithm to calculate the calibrated model parameters and the calibrated function parameters rendering the Nash-Sutcliffe efficiency coefficient, the logarithmic Nash-Sutcliffe efficiency coefficient, and the Pearson correlation coefficient in the objective functions simultaneously reaching preset target values.

In an embodiment, the preset target values are respectively in a range from 0.5 to 1.

In an embodiment, the calibrating the model parameters of the initial hydrological model and calibrating the function parameters of the initial River Width-Discharge converting function according to the objective functions, to obtain the calibrated hydrological model and the calibrated River Width-Discharge converting function is based on an iterative algorithm and comprises:

inputting the forcing data and multiple sets of the model parameters into the initial hydrological model of the river basin to be measured, and outputting multiple simulated discharges corresponding to the multiple sets of the model parameters;

inputting the river width and multiple sets of the function parameters into the River Width-Discharge converting function, and outputting multiple converted discharges corresponding to the multiple sets of the function parameters;

respectively substituting the simulated discharge and the converted discharge into the objective functions;

selecting a set of the model parameters corresponding to a preset target value of the objective functions as the calibrated model parameters, to obtain the calibrated hydrological model; and selecting a set of the function parameters corresponding to the preset target value of the objective functions as the calibrated function parameters, to obtain the calibrated River Width-Discharge converting function.

In an embodiment, the preset target value of the objective functions is respectively in a range from 0.5 to 1.

In an embodiment, the water body index is NDWI or MNDWI and is calculated as follows:

$$NDWI = (Green - NIR)/(Green + NIR)$$

$$MNDWI = \frac{Green - SWIR}{Green + SWIR}$$

wherein Green is the surface reflectance for green band; SWIR is the surface reflectance for short-wave infrared band; and NIR is the surface reflectance for near infrared band.

In an embodiment, the predetermined number of water body section vectors are perpendicular to the water body vector, a length of each water body section vector is greater than the river width of the river basin to be measured, and the obtaining the average value of length of water body sections, according to the water body vector and the predetermined number of water body section vectors, comprises:

superposing the water body section vectors and the water body vector, that is, moving the water body section vectors in a direction perpendicular to the water body vector toward the water body vector, till the water body section vectors and the water body vector intersect;

obtaining a predetermined number of intersection lines, and extracting a length of each intersection line of each water body section vector and the water body vector; and calculating an average length of the predetermined number of intersection lines, namely, the average length of the water body sections.

In an embodiment, simulating the discharge of the river basin to be measured according to the forcing data and the calibrated hydrological model of the river basin to be measured, to obtain the simulated discharge of the river basin to be measured, comprises:

inputting the forcing data into multiple calibrated hydrological models corresponding to multiple sets of calibrated model parameters, to obtain multiple parameter-simulated discharges; wherein each set of calibrated model parameters correspond to a parameter-simulated discharge; and acquiring an average value of the multiple parameter-simulated discharges, and regarding the average value of the multiple parameter-simulated discharges as the simulated discharge.

In an embodiment, the first function is represented by a following relational equation or a deformation of the following relational equation:

$$D = \frac{D_{max}}{W_{max}^2} * W^2$$

wherein, D is the water depth; W is the river width; $D_{max}$ is the maximum water depth of the river basin to be measured; and $W_{max}$ is the maximum river width of the river basin to be measured.

In an embodiment, the second function is represented by a following relational equation or a deformation of the following relational equation:

$$Q = a_1 D^{b_1}$$

wherein, Q is the discharge; D is the water depth; $a_1$ is the third parameter; and $b_1$ is the fourth parameter.

The present application further provides a device for simulating discharge, comprising:

an acquiring module, which is configured to acquire the forcing data, wherein the forcing data is configured to characterize climatic conditions of the river basin to be measured; and a simulating module, which is configured to simulate the discharge of the river basin to be measured according to the forcing data and a calibrated hydrological model of the river basin to be measured, to obtain a simulated discharge of the river basin to be measured; the calibrated hydrological model is a model comprising calibrated model parameters; and the calibrated model parameters are obtained by calibrating model parameters of an initial hydrological model, according to a converted discharge of the river basin to be measured and the GRACE-derived total water storage changes of the river basin to be measured; the converted discharge of the river basin is obtained by a remote sensing satellite, and the GRACE-derived total water storage changes of the river basin are obtained by a gravity satellite; the converted discharge corresponds to a river width of the river basin to be measured.

The present application further provides a computer device, comprising a memory and a processor, wherein the memory is configured to store a computer program; and the processor is configured to run the computer program to implement the method above.

The present application provides the method and the device for simulating the discharge, and the computer device. The method includes steps of: acquiring the forcing data; simulating the discharge according to the forcing data and the calibrated hydrological model of the river basin to be measured, to obtain the simulated discharge of the river basin to be measured. The calibrated hydrological model is a hydrological model including the calibrated model parameters. The calibrated model parameters are obtained by the calibrating model parameters of an initial hydrological model, according to the converted discharge obtained by the remote sensing satellite. In the present application, simulating the discharge of the river basin to be measured by adopting the calibrated hydrological model, other than transplanting parameters of other river basins in the related technology, can accurately reflect the characteristics of the river basin to be measured.

BRIEF DESCRIPTION OF THE DRAWINGS

FIG. 2 is a schematic flow chart of calibrating a hydrological model according to an embodiment of the present application.

DETAILED DESCRIPTION

In order to make the objectives, technical solutions and advantages of the present disclosure clearer and better understood, the present application will be further described in detail below with reference to the accompanying drawings and embodiments. It should be understood that the specific embodiments described herein are merely illustration of the present application, but not intended to limit the present application.

It should be noted that, the main executing body of the method for simulating discharge provided by the embodiment of the present application, can be a device for simulating discharge, and the device for simulating the discharge can be part or all of a computer device implemented by means of software, hardware, or a combination of software and hardware. Optionally, the computer device can be an electronic device with a function of processing data, such as a PC, a portable device, or a server. The specific form of the computer device is not limited in this embodiment. The main executing bodies of the method embodiments described hereafter are described by taking the computer device as an example.

Figure 1:
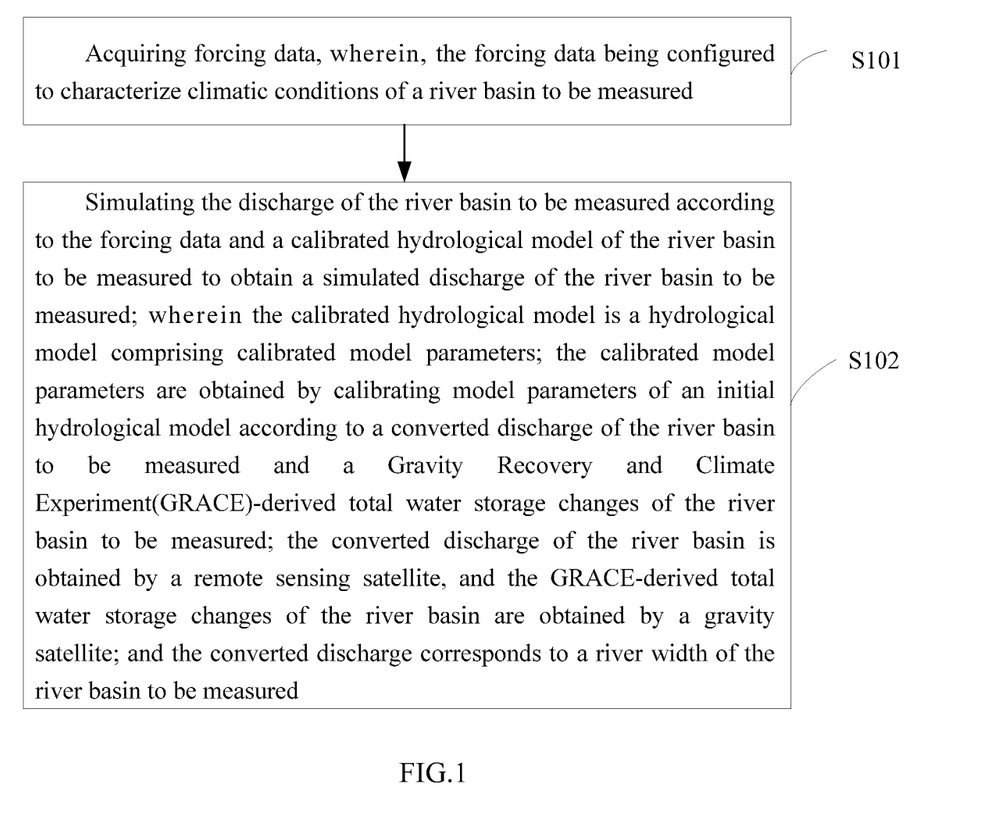
FIG. 1 is a schematic flow chart of a method for simulating discharge according to an embodiment of the present application.

Referring to FIG. 1, an embodiment of a method for simulating discharge includes:

S101, acquiring forcing data; and

S102, simulating the discharge of the river basin to be measured according to the forcing data and the calibrated hydrological model of the river basin to be measured, to obtain a simulated discharge of the river basin to be measured.

In S101, the forcing data are configured to characterize the climatic conditions of the river basin to be measured, such as precipitation conditions, temperature conditions, and vegetation coverage conditions. Specifically, the forcing data can include but are not limited to the data information related with the hydrological model employed, such as the amount of precipitation, the evapotranspiration, the soil moisture, the snow cover, the parameters of solar radiation, the ground temperature, the seasonal land surface structure parameters such as vegetation structure and hydrological roughness of the river basin to be measured. The forcing data are input into a hydrological model of the river basin to be measured, to drive the hydrological model to simulate the discharge.

Specifically, the computer device can obtain the forcing data through user's inputting, from other databases, or from other acquiring devices. The acquiring device can be the computer device itself or any other computer device.

In S102, the discharge of the river basin to be measured is simulated according to the forcing data and the calibrated hydrological model of the river basin to be measured.

The hydrological model is selected in advance, before S102, for the river basin to be measured. The hydrological model includes model parameters, which are initially variables, and need to be calibrated to have specific ranges or to have certain values. In an embodiment, the initial hydrological model is the CREST-snow hydrological model including 18 model parameters. The calibrated hydrological model is the hydrological model including the calibrated model parameters. The calibrated model parameters are obtained by calibrating the model parameters of the initial hydrological model, according to a converted discharge of the river basin to be measured and the Gravity Recovery and Climate Experiment (GRACE)-derived total water storage changes of the river basin to be measured. The converted discharge of the river basin is obtained by a remote sensing satellite. The GRACE-derived total water storage changes of the river basin are obtained by a gravity satellite. The converted discharge corresponds to a river width of the river basin to be measured, and the corresponding relationship can be expressed by a function or equation, such that the converted discharge can be calculated according to the river width and the function or equation of the river width and the converted discharge.

Specifically, the computer device, by implementing a program, inputs the acquired forcing data into the calibrated hydrological model, and simulates the discharge according to the calibrated hydrological model and the forcing data, thereby outputting the simulated discharge of the river basin to be measured. The calibrated model parameters can be adjusted according to the characteristics of the river basins in different regions and in different seasons characterized by the forcing data, so that the calibrated model parameters can adapt to the specific conditions of different river basins.

The calibrated hydrological model is a model calibrated according to the converted discharge of the river basin to be measured and the GRACE-derived total water storage changes of the river basin to be measured. The converted discharge of the river basin is obtained by the remote sensing satellite, and the GRACE-derived total water storage changes of the river basin are obtained by the gravity satellite. The converted discharge has a corresponding relationship with the river width of the river basin to be measured. Therefore, the model parameters of the initial hydrological model can be calibrated according to the river width of the river basin to be measured, so that the parameters of the calibrated hydrological model can be more matched with the actual characteristics of the river basin. Simulating the discharge by adopting the calibrated hydrological model, other than transplanting parameters of other river basins in the related technology, avoids the problem of inaccurate discharge simulation. The forcing data is capable of characterizing the climatic conditions of the river basin to be measured. After the calibration, the model can realize an estimation of the discharge of the river basin only through the forcing data characterizing the climatic conditions of the river basin to be measured, thereby greatly improving the estimation accuracy of the discharge of the river basin to be measured. By accurately simulating the discharge of the river basin, no observational data of the discharge is needed.

In an embodiment, referring to FIG. 2, before S102, the method includes:

S201, acquiring the converted discharge of the river basin to be measured through the remote sensing satellite;

S202, acquiring the GRACE-derived total water storage changes of the river basin to be measured through the gravity satellite;

S203, constructing objective functions; and

S204, calibrating the model parameters of the initial hydrological model and calibrating function parameters of an initial River Width-Discharge converting function according to the objective functions, to obtain the calibrated hydrological model and the calibrated River Width-Discharge converting function, the calibrated River Width-Discharge converting function is the River Width-Discharge converting function including calibrated function parameters.

In S201, the converted discharge of the river basin to be measured is converted according to the river width measured by the remote sensing satellite in different time periods. The relationship of the river width and the converted discharge is characterized by a River Width-Discharge converting function. The River Width-Discharge converting function associates a river width to a discharge. The River Width-Discharge converting function can be established based on a Water Depth-River Width converting function associating a river width to a water depth, and a Water Depth-Discharge converting function associating a water depth to a discharge.

Specifically, the computer device obtains the converted discharge of the river basin to be measured from remotely-sensed images acquired by the remote sensing satellite. The converted discharge of the river basin to be measured acquired by the remote sensing satellite can manually input into the computer device, or automatically obtained by the computer device from the remote sensing satellite. The computer device acquires the remotely-sensed images of the river basin to be measured through the remote sensing satellite, and obtains the river width of the river basin to be measured based on the remotely-sensed images. The computer device establishes the Water Depth-Discharge converting function according to the Water Depth-River Width converting function and the Water Depth-Discharge converting function, and further obtains the converted discharge of the river basin to be measured according to the river width and the River Width-Discharge converting function.

In S202, the GRACE-derived total water storage changes are measured by the gravity satellite in different time periods.

Specifically, the computer device acquires the GRACE-derived total water storage changes of the river basin to be measured through the gravity satellite. The data of the GRACE-derived total water storage changes can be manually input into the computer device. The GRACE-derived total water storage changes are the changes of soil water storage, groundwater storage, glacial mass, and snow water equivalent of the river basin.

In S203, the objective functions includes a discharge objective function between the simulated discharge simulated by the initial hydrological model and the converted discharge, and a total water storage objective function between the simulated total water storage changes simulated by the initial hydrological model and the GRACE-derived total water storage changes.

Specifically, the computer device, by implementing a program, constructs the objective functions. The objective functions are configured to characterize the credibility of the hydrological model.

In an embodiment, the discharge objective functions are a first equation of Nash-Sutcliffe efficiency coefficient (NSE) between the simulated discharge and the converted discharge, and a second equation of logarithmic Nash-Sutcliffe efficiency coefficient (NSE(log)) between the simulated discharge and the converted discharge. The storage objective function is a third equation of Pearson correlation coefficient (CC) between the simulated total water storage changes and the GRACE-derived total water storage changes.

The theoretical optimal value of the NSE, NES(log), and CC are all 1. The larger the value of the coefficients, the higher the credibility of the hydrological model, and vice versa. To calibrate the model parameters and function parameters, the NSE, NSE(log), and CC can be assigned with preset target values such as in a range from 0.5 to 1.

The first to third equations for respectively calculating the NSE, NSE(log), and CC are as follows:

$$NSE = 1 - \frac{(Q_e - Q_m)^2}{(Q_m - \overline{Q_m})^2}$$

$$NSE(\log) = 1 - \frac{(\log(Q_e) - \log(Q_m))^2}{(\log(Q_m) - \overline{\log(Q_m)})^2}$$

$$CC(T_{sim}, T_{obs}) = r(T_{sim}, T_{obs})$$

wherein, $Q_e$ is the simulated discharge; $Q_m$ is the converted discharge; $T_{sim}$ is the time series of the simulated total water storage changes simulated by the initial hydrological model in the preset time period; $T_{obs}$ is the time series of the GRACE-derived total water storage changes measured by the gravity satellite in the preset time period, and r characterizes an equation for calculating the Pearson correlation coefficient.

In an embodiment, the simulated discharge, the converted discharge, the logarithmic simulated discharge, and the logarithmic converted discharge are all in forms of time series. The simulated total water storage changes and the GRACE-derived total water storage changes are all in forms of time series of anomaly. The computer device, by implementing a program, constructs the objective functions based on the time series and time series of anomaly. The anomaly is a difference between a certain number of a set of data and an average of the set of data.

In an embodiment, $T_{obs}$ is the anomaly series of the monthly GRACE-derived total water storage measured in the preset time period. $T_{sim}$ is the anomaly series of simulated monthly total water storages simulated in the preset time period.

In S204, the model parameters of the initial hydrological model and the function parameters of the initial River Width-Discharge converting function are calibrated according to the objective functions, to obtain the calibrated hydrological model and the calibrated River Width-Discharge converting function.

Specifically, the computer device, by implementing a program based on an iterative algorithm, inputs the forcing data and multiple sets of the model parameters into an initial hydrological model adopted for the river basin to be measured, and outputs multiple simulated discharges corresponding to the multiple sets of the model parameters. In an embodiment, the initial hydrological model is the CREST-snow hydrological model. The CREST-snow hydrological model involves 18 model parameters. The computer device, by implementing the program based on the iterative algorithm, also inputs the river width and multiple sets of the function parameters into the River Width-Discharge converting function, and outputs the converted discharges corresponding to the multiple sets of function parameters. Then, the computer device, by implementing the program based on the iterative algorithm, substitutes the simulated discharges and the converted discharges into the objective functions to have the NSE, NSE(log), and CC reach the preset target values. Based on the iterative algorithm, the model parameters and function parameters that render the NSE, NSE (log), and CC simultaneously reaching the present target values can be selected as the calibrated model parameters and the calibrated function parameters. The theoretical optimal value of the NSE, NSE(log), and CC is 1, but the values in the range from 0.5 to 1 are all acceptable, as errors may exist in the remote sensing data and calculation. The preset target values of the NSE, NSE(log), and CC can be in the range from 0.5 to 1. The calibrated model parameters and the calibrated function parameters, are adopted to update the initial hydrological model and the initial River Width-Discharge converting function, to obtain the calibrated hydrological model and the calibrated River Width-Discharge converting function. The forcing data for training the model are capable of characterizing the climatic conditions of the river basin to be measured, and have a corresponding relationship with the data needed to be input into the initial hydrological model. The initial hydrological model, different from the calibrated hydrological model, refers to any one of the hydrological models used in the process of iteratively computing; and the initial hydrological model is updated continuously in the process of the iteratively computing.

In the embodiment of the method for calibrating the initial hydrological model, the objective functions between the simulated values (including the simulated discharge and the simulated total water storage changes) and the measured values (including the converted discharge and the GRACE-derived total water storage changes) are constructed. The simulated values are generated by the initial hydrological model, and the measured values are generated by the initial River Width-Discharge converting function, both of which have undetermined parameters. Based on the iterative algorithm, the values of the undetermined parameters (including the model parameters of the initial hydrological model and the function parameters of the initial River Width-Discharge converting function) are continuously updated to output the simulated discharge and the converted discharge rendering the coefficients in the objective function reaching the optimal values or the preset target values, thereby calibrating the initial hydrological model and obtaining the calibrated hydrological model. The objective functions includes the function between the simulated discharge and the converted discharge, and the function between the simulated total water storage changes and the GRACE-derived total water storage changes, and the converted discharge has a corresponding relationship with the river width of the river basin to be measured, therefore, the computer device can calibrate the initial hydrological model according to the measured river width, the discharge converted by the measured river width, and the GRACE-derived total water storage changes. Therefore, the reliability of the calibrated hydrological model is relatively high. The calibrated hydrological model with high reliability can greatly improve the simulation accuracy of the discharge of the river basin to be measured.

Figure 3:
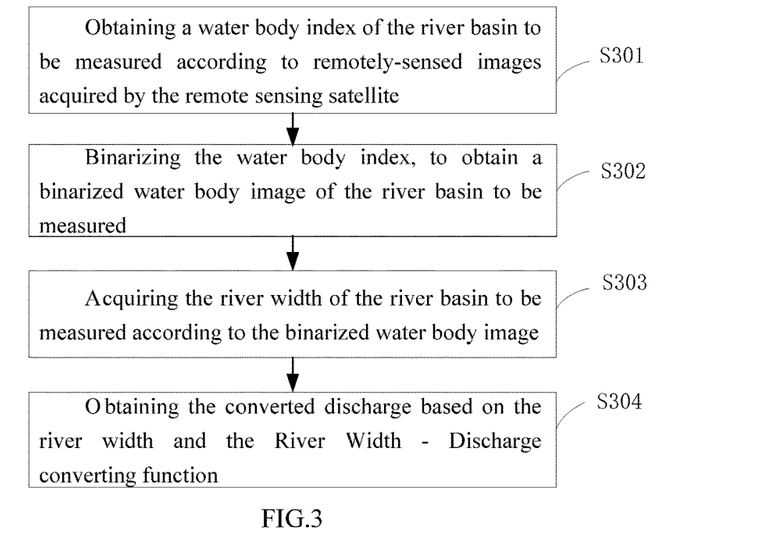
FIG. 3 is a schematic flow chart of acquiring a converted discharge of a river basin to be measured through a remote sensing satellite according to an embodiment of the present application.

In an embodiment, referring to FIG. 3, S201 includes:

S301, obtaining a water body index of the river basin to be measured according to remotely-sensed images acquired by the remote sensing satellite;

S302, binarizing the water body index, to obtain a binarized water body image of the river basin to be measured;

S303, acquiring the river width of the river basin to be measured according to the binarized water body image; and S304, obtaining the converted discharge based on the river width and the River Width-Discharge converting function.

In S301, the computer device acquires the remotely-sensed images of the river basin to be measured through the remote sensing satellite. The remotely-sensed images can be digital images of the river basin to be measured. The computer device, by implementing a program, obtains the water body index of the river basin to be measured in the digital images. The water body index, NDWI or MNDWI, is calculated as follows:

$$NDWI=(Green-NIR)/(Green+NIR)$$

$$MNDWI=(Green-SWIR)/(Green+SWIR)$$

wherein, Green is the surface reflectance of green band; SWIR is the surface reflectance for short-wave infrared band; and NIR is the surface reflectance of near infrared band.

In S302, the computer device, by implementing a program based on an OTSU algorithm, binarizes the water body on the remotely-sensed images, from which the water body index, NDWI or MNDWI, is extracted, to obtain a binarized water body image of the river basin to be measured. Optionally, the computer device can also adopt a contour of the binarized water body image as contour data.

In S303, the computer device, by implementing a program, can obtain the river width of the river basin to be measured according to the contour data of the river of the river basin to be measured in the binarized water body image.

The river width can be an effective river width or an at-a-section river width. The effective river width is a river width calculated according to a water body area when the binarized water body image is discontinuous or incomplete, and the water body area is obtained according to the binarized water body image. The at-a-section river width of the river basin to be measured is acquired according to the binarized water body image when the binarized water body image of the river basin to be measured is continuous or complete. The at-a-section river width is more precise and more accurate than the effective river width.

In S304, the River Width-Discharge converting function is stored in the computer device, the acquired river width is input into the River Width-Discharge converting function, and the converted discharge is calculated by the River Width-Discharge converting function. The River Width-Discharge converting function characterizes the relationship between the river width and the discharge of the river basin to be measured, and is based on the Manning formula.

The computer device obtains the remotely-sensed images of the river basin to be measured through the remote sensing satellite; the computer device performs binarization for the remotely-sensed images, to obtain the binarized water body image; the computer device generates the river width of the river basin to be measured according to the binarized water body image; the computer device obtains the converted discharge, according to the river width and the River Width-Discharge converting function. No gauging stations on the ground are required to acquire the data of the discharge, thereby avoiding the cost for constructing and maintaining the gauging stations, and revealing the economic efficiency of the discharge simulation.

Figure 4:
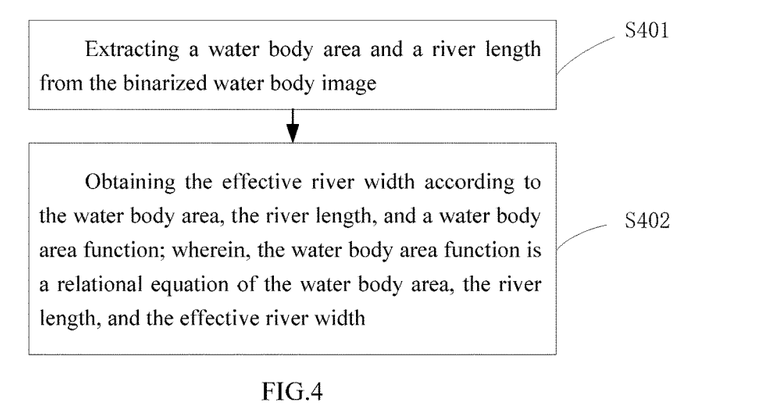
FIG. 4 is a schematic flow chart of a method for acquiring an effective river width according to an embodiment of the present application.

In an embodiment, when the extracted and binarized water body image of the river basin to be measured is discontinuous or incomplete due to external environmental factors such as cloud layers and buildings obstacles, the water body area of the river basin to be measured are obtained according to the binarized water body image, and the effective river width is calculated. Referring to FIG. 4, in an embodiment, the effective river width is specifically obtained through the following steps:

S401, extracting a water body area and a river length from the binarized water body image; and S402, obtaining the effective river width according to the water body area, the river length, and a water body area function.

In S401, the computer device, by implementing a program, calculates and extracts the water body area of the binarized water body image based on the river contour data of the river basin to be measured. The river contour data are obtained based on the binarized water body image.

In S402, the water body area function represents a relationship equation of the water body area, the river length, and the effective river width.

Specifically, the computer device, by implementing a program, inputs the water body area and the river length into the water body area function, and obtains the effective river width according to the water body area function. The water body area function satisfies the following formula:

$$Area = W_{effective} * Length$$

The formula for calculating the effective river width, which is derived from the water body area function, is as follows:

$$W_{effective} = \frac{Area}{Length}$$

wherein, $W_{effective}$ is the effective river width; Area is the water body area calculated according to the binarized water body image; and Length is the river length of the river basin to be measured.

Figure 5:
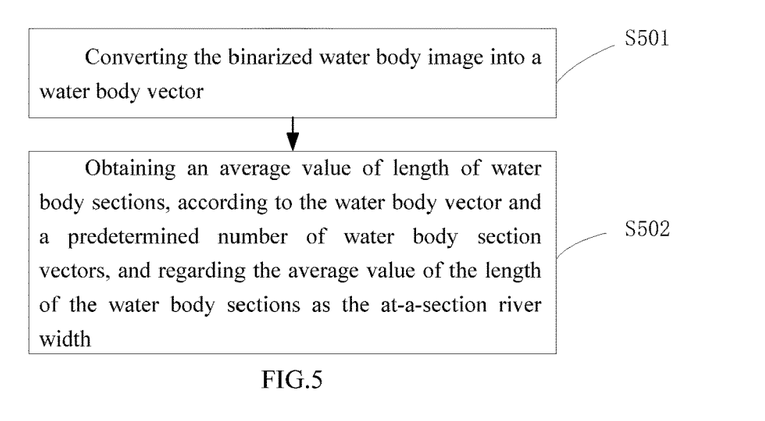
FIG. 5 is a schematic flow chart of a method for acquiring an at-a-section river width according to an embodiment of the present application.

In an embodiment, when the extracted and binarized water body image of the river basin to be measured is relatively continuous and complete, the at-a-section river width of the river basin to be measured is calculated. Referring to FIG. 5, in an embodiment, the at-a-section river width is specifically obtained by the following steps:

S501, converting the binarized water body image into a water body vector; and

S502, obtaining an average value of length of water body sections, according to the water body vector and a predetermined number of water body section vectors, and the average value of the length of the water body sections is regarded as the at-a-section river width.

In S501, the computer device, by implementing a program, converts the binarized water body image into the water body vector. That is, the computer device converts the binarized water body image into the water body vector that characterizes a plane of the river contour of the river basin to be measured.

In S502, the computer device, by implementing a program, presets the predetermined number of water body section vectors perpendicular to the water body vector. The length of each water body section vector is greater than the river width of the river basin to be measured. The water body section vectors and the water body vector are supposed, that is, the water body section vectors are moved in a direction perpendicular to the water body vector to the water body vector, till the water body section vectors and the water body vector intersect. The predetermined number of intersection lines is obtained, and the length of each intersection line of each water body section vector and the water body vector is extracted. The average length of the predetermined number of intersection lines, namely, the average length of the water body sections, is calculated and the average length is regarded as the at-a-section river width.

In another embodiment, when the binarized water body image is continuous and complete, the at-a-section river width can be directly extracted by a graphics software such as RivWidth according to the binarized water body image.

In the above embodiments, the type of the acquired river width can be determined by whether the obtained binarized water image is continuous and complete. When the binarized water body image is continuous and completed, the at-a-section river width of the river basin to be measured can be acquired. When the binarized water body image is discontinuous or incomplete, the effective river width of the river basin to be measured can be acquired. The acquiring methods of the river width are diversified, and specifically selected according to actual situations.

Figure 6:
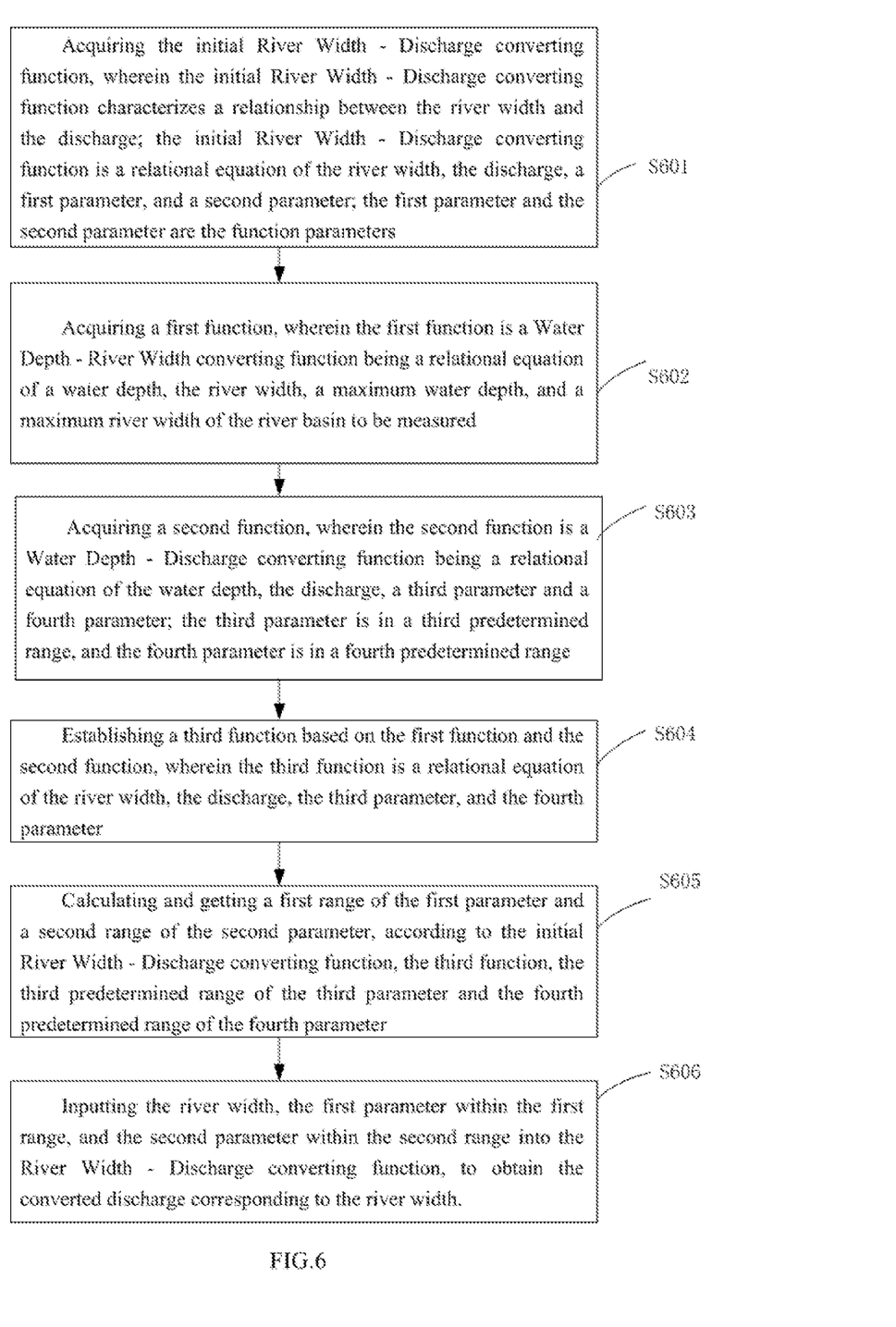
FIG. 6 is a schematic flow chart of obtaining the converted discharge based on the river width and the River Width-Discharge converting function according to an embodiment of the present application.

In an embodiment, referring to FIG. 6, S304, includes:

S601, acquiring the initial River Width-Discharge converting function;

S602, acquiring a first function, that is a Water Depth-River Width converting function;

S603, acquiring a second function, that is a Water Depth-Discharge converting function;

S604, establishing a third function based on the first function and the second function, to obtain a third function;

S605, calculating and getting a first range of the first parameter and a second range of the second parameter, according to the initial River Width-Discharge converting function, the third function, the third predetermined range of the third parameter and the fourth predetermined range of the fourth parameter; and S606, inputting the river width, the first parameter within the first range, and the second parameter within the second range into the River Width-Discharge converting function, to obtain the converted discharge corresponding to the river width.

In S601, the initial River Width-Discharge converting function characterizes a relationship between the river width and the discharge. The initial River Width-Discharge converting function is a relational equation of the river width, the discharge, a first parameter, and a second parameter. The first parameter and the second parameter are the function parameters.

Specifically, the computer device acquires the initial River Width-Discharge converting function of the river width and the discharge. The initial River Width-Discharge converting function is input into the computer device by the user in advance. The initial River Width-Discharge converting function can be obtained by adjusting the Manning's formula. The Manning's formula characterizes the relationship between the river width and the discharge, and is applicable to an ideal river with a triangular section. As there are few natural rivers with ideal triangular sections, the Manning formula should be adjusted. The index 8/3 characterizing the shape of the section is substituted with a parameter to be calibrated, to obtain the River Width-Discharge converting function applicable to a natural river with a non-triangular section.

The Manning formula satisfies the following formula:

$$Q = aW^{8/3}$$

The River Width-Discharge converting function obtained by adjusting the Manning formula satisfies the following formula or satisfies a deformation of the following formula:

$$Q = aW^b$$

wherein, Q is the discharge; W is the river width; a is a first parameter; and b is a second parameter. The River Width-Discharge converting function is the relational equation of the river width W, the discharge Q, the first parameter a, and the second parameter b; the first parameter a and the second parameter b are the function parameters to be calibrated.

In S602, the first function is a Water Depth-River Width converting function. The first function is a relational equation of the water depth, the river width, a maximum water depth, and a maximum river width of the river basin to be measured.

Specifically, the computer device acquires the first function input by the user in advance. The first function characterizes the relationship between the water depth and the river width of the river basin to be measured, and satisfies the following formula or satisfies a deformation of the following formula:

$$D = \frac{D_{max}}{W_{max}^2} * W^2$$

wherein, D is the water depth; W is the river width; $D_{max}$ is the maximum water depth of the river basin to be measured; and $W_{max}$ is the maximum river width of the river basin to be measured. Under the condition that the maximum water depth and the maximum river width of the river basin to be measured are known, the relationship between the water depth D and the river width W can be obtained according to the first function.

In S603, the second function is a Water Depth-Discharge converting function. The second function is a relational equation of the water depth, the discharge, a third parameter, and a fourth parameter. The third parameter is in a third predetermined range, and the fourth parameter is in a fourth predetermined range.

Specifically, the computer device acquires the second function that is input by the user in advance. The second function characterizes the relationship between the water depth and the discharge of the river basin to be measured, and the second function satisfies the following formula or a deformation of the following formula:

$$Q = a_1 D^{b_1}$$

wherein, Q is the discharge; D is the water depth; $a_1$ is the third parameter; and $b_1$ is the fourth parameter. Under the condition that the range of the third parameter $a_1$ and the range of the fourth parameter $b_1$ are predetermined, the relationship between the water depth D and the discharge Q can be obtained according to the second function.

The third function is a relational equation of the river width, the discharge, the third parameter, and the fourth parameter.

Specifically, the computer device, by implementing a program, substitutes the first function in the second function, to obtain the third function of the river width and the discharge. The third function satisfies the following formula or a deformation of the following formula:

$$Q = a_1 \left(\frac{D_{max}}{W_{max}^2}\right)^{b_1} * W^{2b_1}$$

wherein, Q is the discharge; $D_{max}$ is the maximum water depth of the river basin to be measured; $W_{max}$ is the maximum river width of the river basin to be measured; $a_1$ is the third parameter; and $b_1$ is the fourth parameter. Under the condition that the maximum water depth $D_{max}$ of the river basin to be measured, the maximum river width $W_{max}$ of the river basin to be measured, the range of the third parameter $a_1$, and the range of the fourth parameter $b_1$ are known or predetermined, the relationship between the river width W and the discharge Q can be obtained according to the third function.

In S605, the initial River Width-Discharge converting function is a function characterizing the relationship between the river width and the discharge, and is a relational equation of the river width, the discharge, the first parameter, and the second parameter. The first parameter and the second parameter are undetermined. The third function is a function characterizing the relationship between the river width and the discharge, and is the relational equation of the river width, the discharge, the third parameter, and the fourth parameter. The range of the third parameter and the range of the fourth parameter are predetermined. According to the River Width-Discharge converting function, the third function, the predetermined range of the third parameter, and the predetermined range of the fourth parameter, the range of the first parameter and the range of the second parameter can be calculated.

In S606, the computer device, by implementing a program, inputs the river width of the river basin to be measured into the River Width-Discharge converting function, and inputs the first parameter within the first range and the second parameter within the second range to the River Width-Discharge converting function, and outputs the discharge according to the relationship between the river width and the discharge, and regards the discharge as the converted discharge.

In this embodiment, the Manning Formula is adjusted to obtain the initial River Width-Discharge converting function including undetermined parameters (the first parameter and the second parameter), and the initial River Width-Discharge converting function is applicable to a natural river and characterizes the relationship between the river width and the discharge. The third function is established based on the first function (namely, the Water Depth-River Width converting function) and the second function (namely, the Water Depth-Discharge converting function). The third function also characterizes the relationship between the river width and the discharge. According to the predetermined third range of the third parameter and the predetermined fourth range of the fourth parameter, the first range of the first parameter and the second range of the second parameter in the initial River Width-Discharge converting function can be obtained. The converted discharge can be computed according to the river width measured by the remote sensing satellite, the first parameter within the first range, and the second parameter within the second range, thus the initial hydrological model is calibrated based on the discharge converted by the river width rather than based on the measured discharge, thereby realizing the discharge simulation of the river basin with few measured data or no measured discharge data.

Figure 7:
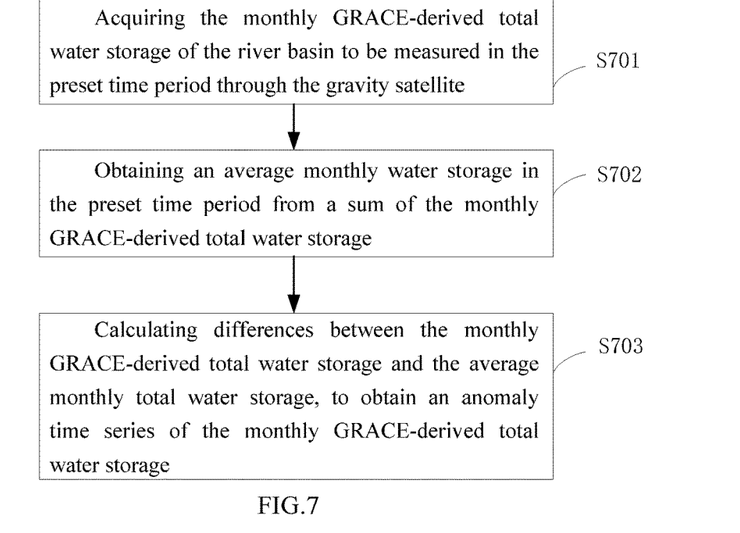
FIG. 7 is a schematic flow chart of acquiring the GRACE-derived total water storage of the river basin to be measured through the gravity satellite according to an embodiment of the present application.

In an embodiment, referring to FIG. 7, the GRACE-derived total water storage changes are the anomaly series of the monthly GRACE-derived total water storage measured in the preset time period, and S202 includes:

S701, acquiring the monthly GRACE-derived total water storage of the river basin to be measured in the preset time period through the gravity satellite;

S702, obtaining a monthly average total water storage in the preset time period from a sum of the monthly GRACE-derived total water storage divided by a number of month of the preset time period; and S703, calculating differences between the monthly GRACE-derived total water storage and the monthly average total water storage, to obtain the anomaly series of the monthly GRACE-derived total water storage.

In S701, the computer device, through the gravity satellite, acquires the monthly GRACE-derived total water storage changes of the river basin to be measured in a preset time period such as in a year. In another embodiment, the preset time period can be any other time period, for example, three months, two years, etc., which is not limited in the present application. Usually, the preset time period can be selected to be one year. The characteristics of a river basin are changed with seasons, therefore, the preset time period of one year can ensure that the data of the whole year are completely collected to form a complete cycle and to characterize the river basin. Alternatively, the monthly GRACE-derived total water storage changes can be arranged in a chronological order to form a sequence.

In S702, the computer device calculates the average value of the monthly GRACE-derived total water storage in the preset time period, for example, in one year, and regards the average value GRACE-derived total water storage as the monthly average total water storage of the year.

In S703, the computer device calculates the difference between each of the monthly GRACE-derived total water storage and the monthly average total water storage, and the differences are arranged according to time, to obtain the anomaly series of the monthly GRACE-derived total water storage in the preset time period. The anomaly series of the monthly GRACE-derived total water storage can be used to characterize the change of the total water storage in the preset time period such as in a whole year, and provides data for subsequently calculating the Pearson correlation coefficient between the simulated total water storage changes and the GRACE-derived total water storage changes.

The monthly GRACE-derived total water storage changes of the river basin to be measured in the preset time period can be acquired by the gravity satellite and processed into the anomaly series, thereby providing data for subsequently calculating the Pearson correlation coefficient in an objective function, increasing the constraints for calibrating the hydrological model, reducing the data operations during calibrating the hydrological model, and improving the calibrating accuracy of the hydrological model.

Figure 8:
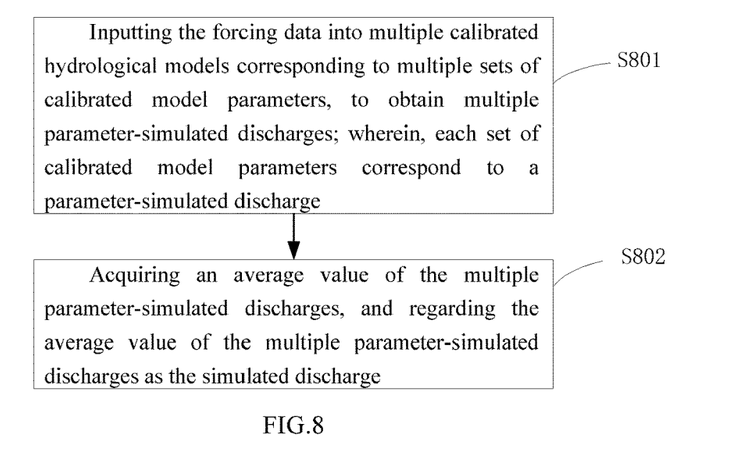
FIG. 8 is a flow chart of an embodiment of simulating the discharge of the river basin to be measured according to the forcing data and the calibrated hydrological model of the river basin to be measured, to obtain the simulated discharge of the river basin to be measured.

In an embodiment, referring to FIG. 8, S102 includes:

S801, inputting the forcing data into multiple calibrated hydrological models corresponding to multiple sets of calibrated model parameters, to obtain multiple parameter-simulated discharges corresponding to multiple sets of calibrated model parameters; and S802, acquiring an average value of the multiple parameter-simulated discharges, and regarding the average value of the multiple parameter-simulated discharges as the simulated discharge.

In S801, the calibrated hydrological model is a hydrological model whose model parameters are determined by calibration, that is the calibrated hydrological model includes multiple sets of the calibrated model parameters. The multiple sets of calibrated model parameters are respectively obtained through the iterative calculation or the calibration as described above. Each of the multiple sets of the calibrated model parameters can render coefficients in the objective functions simultaneously reaching the preset target values. The computer device, by implementing a program, inputs the forcing data into multiple calibrated hydrological models respectively including each of the multiple sets of the calibrated model parameters, and obtains the simulated discharges respectively corresponding to each of the multiple sets of calibrated model parameters.

In S802, the average value of the simulated discharges corresponding to the multiple sets of calibrated model parameters, is calculated and is regarded as the simulated discharge of the river basin to be measured.

In this embodiment, multiple sets of calibrated model parameters are obtained to make the value of the objective function reach the preset target value. The multiple sets of calibrated model parameters are substituted into the initial hydrological model respectively, to obtain the multiple calibrated hydrological models. The multiple calibrated hydrological models are used to simulate the discharge of the river basin to be measured to improve the precision of the simulated discharge.

Figure 9:
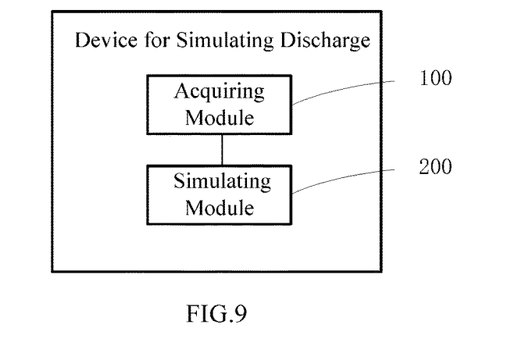
FIG. 9 is a schematic structural diagram of a device for simulating the discharge according to an embodiment of the present application.

In an embodiment, referring to FIG. 9, the present application further provides a device for simulating the discharge. The device for simulating the discharge includes an acquiring module 100 and a simulating module 200.

The acquiring module 100 is configured to acquire the forcing data, and the forcing data is configured to characterize climatic conditions of the river basin to be measured.

The simulating module 200 is configured to simulate the discharge of the river basin to be measured according to the forcing data and the calibrated hydrological model of the river basin to be measured, to obtain a simulated discharge of the river basin to be measured.

The device for simulating the discharge provided by this embodiment can perform the foregoing method embodiments, and the implementation principles and technical effects are similar to those described above, which will not be described herein again.

In an embodiment, the present application also provides a computer device including a memory and a processor. The memory is configured to store a computer program, and the processor is configured to run the computer program to implement the steps in the above method embodiments.

The computer device provided in this embodiment can perform the foregoing method embodiments, and the implementation principles and technical effects are similar to those described above, which will not be described herein again.

In an embodiment, the present application further provides a computer readable storage medium, and a computer program is stored in the computer readable storage medium. When the computer program is run in the computer, the computer device performs the steps in the foregoing method embodiments.

The computer readable storage medium provided by this embodiment can perform the foregoing method embodiments, and the implementation principles and technical effects are similar to those described above, which will not be described herein again.

All or part of the above embodiments can be implemented through software, hardware, firmware or any combination thereof. When the embodiments are implemented through a software program, all or part of the embodiments can be implemented in the form of a computer program product. The computer program product can include one or more computer instructions. When the computer program instructions are loaded and executed in the computer, all or part of the processes or functions described in the embodiments of the present invention are implemented. The computer can be a universal computer, a dedicated application computer, a computer network or other programmable devices. The computer instructions can be stored in the computer readable storage medium or can be transferred from one computer readable storage medium to another computer storage media. For example, the computer instructions can be transferred from a website site, a computer, a server, or a data center to another website site, another computer, another server, or another data center via a wired transmission (e.g., coaxial cable, optical digital subscriber line DSL) or a wireless transmission (e.g., infrared, wireless, microwave, etc.). The computer readable storage medium can be any available media that can be accessed by a computer or a data storage device like a server, a data center, etc., which is integrated by one or more available medias. The available media can be a magnetic medium such as a floppy disk, a hard disk, a magnetic tape, an optical medium (e.g., DVD), or a semiconductor medium (e.g., a solid state disk SSD).

The foregoing technical features involved in the embodiments can be combined arbitrarily. For the sake of concision of the description, not all possible combinations of the technical features of the embodiments are described. However, as long as there is no contradiction in the combinations of these technical features, the combinations should be considered to be within the scope of the description.

What described above are several embodiments of the present invention, and these embodiments are specific and in details, but not intended to limit the scope of the present invention. It should be understood by the skilled in the art that various modifications and improvements can be made without departing from the scope of the present invention. Therefore, the scope of the present disclosure is defined by the appended claims.

What is claimed is:

1. A method for simulating discharge, comprising:
acquiring forcing data; and
simulating the discharge of the river basin to be measured according to the forcing data and a calibrated hydrological model of the river basin to be measured to obtain a simulated discharge of the river basin to be measured;
wherein the forcing data are configured to characterize climatic conditions of a river basin to be measured; the calibrated hydrological model is a hydrological model comprising calibrated model parameters; the calibrated model parameters are obtained by calibrating model parameters of an initial hydrological model according to a converted discharge of the river basin to be measured and a Gravity Recovery and Climate Experiment-derived ("GRACE-derived") total water storage changes of the river basin to be measured; the converted discharge of the river basin is obtained by a remote sensing satellite, and the GRACE-derived total water storage changes of the river basin are obtained by a gravity satellite; and the converted discharge corresponds to a river width of the river basin to be measured;

the GRACE-derived total water storage changes are anomaly series of monthly GRACE-derived total water storage measured in a preset time period, and acquiring the GRACE-derived total water storage changes of the river basin to be measured through a gravity satellite comprises:
acquiring the monthly GRACE-derived total water storage of the river basin to be measured in the preset time period through the gravity satellite;
obtaining an average monthly water storage in the preset time period from a sum of the monthly GRACE-derived total water storage; and
calculating differences between the monthly GRACE-derived total water storage and the average monthly total water storage, to obtain an anomaly time series of the monthly GRACE-derived total water storage.

2. The method according to claim 1, wherein before the simulating the discharge of the river basin to be measured according to the forcing data and the calibrated hydrological model of the river basin to be measured to obtain the simulated discharge of the river basin to be measured, the method comprises:
acquiring the converted discharge of the river basin to be measured through the remote sensing satellite, wherein: the converted discharge of the river basin to be measured is converted according to the river width measured by the remote sensing satellite in different time periods; a relationship of the river width and the converted discharge is characterized by a River Width-Discharge converting function, and the River Width-Discharge converting function is established based on a Water Depth-River Width converting function and a Water Depth-Discharge converting function; the Water Depth-River Width converting function is represented by a relational equation of $$D = \frac{D_{max}}{W_{max}^2} * W^2$$

wherein D is a water depth, W is a river width, $D_{max}$ is a maximum water depth of the river basin to be measured, and $W_{mas}$ is a maximum river width of the river basin to be measured;
the Water Depth-Discharge converting function is represented by a relational equation of $$Q = a_1 D^{b_1}$$

wherein Q is a discharge, D is the water depth, $a_1$ is a third parameter, $b_1$ is a fourth parameter, the third parameter is in a third predetermined range, and the fourth parameter is in a fourth predetermined range; and
the River Width-Discharge converting function satisfies a formula of $$Q = aW^b$$

wherein Q is the discharge, W is the river width, a is a first parameter, b is a second parameter, and the first parameter a and the second parameter b are the function parameters to be calibrated;
constructing objective functions, wherein the objective functions comprise a discharge objective function between the simulated discharge simulated by the initial hydrological model and the converted discharge, and a total water storage objective function between simulated total water storage changes simulated by the initial hydrological model and the GRACE-derived total water storage changes; and calibrating the model parameters of the initial hydrological model and calibrating function parameters of an initial River Width-Discharge converting function according to the objective functions, to obtain the calibrated hydrological model and a calibrated River Width-Discharge converting function, wherein the calibrated River Width-Discharge converting function is the River Width-Discharge converting function including calibrated function parameters.

3. The method according to claim 2, wherein the acquiring the converted discharge of the river basin to be measured through the remote sensing satellite, comprises:

obtaining a water body index of the river basin to be measured according to remotely-sensed images acquired by the remote sensing satellite;

binarizing the water body index, to obtain a binarized water body image of the river basin to be measured;

acquiring the river width of the river basin to be measured according to the binarized water body image; and obtaining the converted discharge based on the river width and the River Width-Discharge converting function.

4. The method according to claim 1, wherein the GRACE-derived total water storage changes are total changes of soil water storage, groundwater storage, glacial mass and snow water equivalent of the river basin.

5. The method according to claim 3, wherein the river width is an effective river width;

the acquiring the river width of the river basin to be measured according to the binarized water body image comprises:

extracting a water body area and a river length from the binarized water body image; and obtaining the effective river width according to the water body area, the river length, and a water body area function; wherein, the water body area function is a relational equation of the water body area, the river length, and the effective river width.

6. The method according to claim 3, wherein, the river width is an at-a-section river width;

the acquiring the river width of the river basin to be measured according to the binarized water body image comprises:

converting the binarized water body image into a water body vector; and obtaining an average value of length of water body sections, according to the water body vector and a predetermined number of water body section vectors, and regarding the average value of the length of the water body sections as the at-a-section river width.

7. The method according to claim 3, wherein the obtaining the converted discharge based on the river width and the River Width-Discharge converting function comprises:

calculating and getting a first range of the first parameter and a second range of the second parameter, according to the River Width Discharge converting function, the third predetermined range of the third parameter and the fourth predetermined range of the fourth parameter; and inputting the river width, the first parameter within the first range, and the second parameter within the second range into the River Width-Discharge converting function, to obtain the converted discharge corresponding to the river width.

8. The method according to claim 2, wherein the objective function comprises a first equation of Nash-Sutcliffe efficiency coefficient between the simulated discharge and the converted discharge, a second equation of logarithmic Nash-Sutcliffe efficiency coefficient between the simulated discharge and the converted discharge, and a third equation of Pearson correlation coefficient between the simulated total water storage changes and the GRACE-derived total water storage changes.

9. The method according to claim 8, wherein, the Nash efficiency coefficient (NSE), the logarithmic Nash efficiency coefficient (NSE(log)) and the Pearson correlation coefficient (CC) are calculated as follows:

$$NSE = 1 - \frac{(Q_e - Q_m)^2}{(Q_m - \overline{Q_m})^2}$$

$$NSE(\log) = 1 - \frac{(\log(Q_e) - \log(Q_m))^2}{(\log(Q_m) - \overline{\log(Q_m)})^2}$$

$$CC(T_{sim}, T_{obs}) = r(T_{sim}, T_{obs})$$

wherein, $Q_e$ is a simulated discharge; $Q_m$ is a converted discharge; $T_{sim}$ is a time series of the simulated water storage changes simulated by the initial hydrological model in the preset time period; $T_{obs}$ is an anomaly time series of the GRACE-derived total water storage changes measured by the gravity satellite in the preset time period, and r characterizes an expression for calculating the Pearson correlation coefficient.

10. The method according to claim 2, wherein the simulated discharge, the converted discharge, a logarithmic simulated discharge, and a logarithmic converted discharge are all in forms of time series; the simulated total water storage changes and the GRACE-derived total water storage changes are all in forms of anomaly time series; and the constructing the objective function comprises constructing the objective functions based on the time series and anomaly time series.

11. The method according to claim 2, wherein the calibrating the model parameters of the initial hydrological model and calibrating the function parameters of the initial River Width-Discharge converting function according to the objective functions are based on an iterative algorithm to calculate the calibrated model parameters and the calibrated function parameters rendering the Nash-Sutcliffe efficiency coefficient, the logarithmic Nash-Sutcliffe efficiency coefficient, and the Pearson correlation coefficient in the objective functions simultaneously reaching preset target values.

12. The method according to claim 11, wherein the preset target values are respectively in a range from 0.5 to 1.

13. The method according to claim 3, wherein the water body index NDWI or MNDWI is calculated as follows:

$$NDWI = (Green - NIR)/(Green + NIR)$$

$$MNDWI = \frac{Green - SWIR}{Green + SWIR}$$

wherein, Green is a surface reflectance of green band; SWIR is a surface reflectance of short-wave infrared band; and NIR is a surface reflectance of near infrared band.

14. The method according to claim 6, wherein, the predetermined number of water body section vectors are perpendicular to the water body vector, a length of each water body section vector is greater than the river width of the river basin to be measured, and the obtaining the average value of length of water body sections, according to the water body vector and the predetermined number of water body section vectors, comprises:

superposing the water body section vectors and the water body vector, that is, moving the water body section vectors in a direction perpendicular to the water body vector towards the water body vector, till the water body section vectors and the water body vector intersect;

obtaining a predetermined number of intersection lines, and extracting a length of each intersection line of each water body section vector and the water body vector; and calculating an average length of the predetermined number of intersection lines, namely, the average length of the water body sections.

15. The method according to claim 1, wherein the simulating the discharge of the river basin to be measured according to the forcing data and the calibrated hydrological model of the river basin to be measured, to obtain the simulated discharge of the river basin to be measured, comprises:

inputting the forcing data into multiple calibrated hydrological models corresponding to multiple sets of calibrated model parameters, to obtain multiple parameter-simulated discharges; wherein, each set of calibrated model parameters correspond to a parameter-simulated discharge; and acquiring an average value of the multiple parameter-simulated discharges, and regarding the average value of the multiple parameter-simulated discharges as the simulated discharge.

16. A device for simulating discharge, comprising:

an acquiring module configured to acquire the forcing data, wherein, the forcing data is configured to characterize climatic conditions of the river basin to be measured; and a simulating module configured to simulate the discharge of the river basin to be measured according to the forcing data and a calibrated hydrological model of the river basin to be measured, to obtain a simulated discharge of the river basin to be measured, wherein:

the calibrated hydrological model is a model comprising calibrated model parameters; the calibrated model parameters are obtained by calibrating model parameters of an initial hydrological model, according to a converted discharge of the river basin to be measured and a GRACE-derived total water storage changes of the river basin to be measured; the converted discharge of the river basin is obtained by a remote sensing satellite, and the GRACE-derived total water storage changes of the river basin are obtained by a gravity satellite; and the converted discharge corresponds to a river width of the river basin to be measured;

the GRACE-derived total water storage changes are anomaly series of monthly GRACE-derived total water storage measured in a preset time period, and acquiring the GRACE-derived total water storage changes of the river basin to be measured through a gravity satellite comprises:

acquiring the monthly GRACE-derived total water storage of the river basin to be measured in the preset time period through the gravity satellite;

obtaining an average monthly water storage in the preset time period from a sum of the monthly GRACE-derived total water storage; and calculating differences between the monthly GRACE-derived total water storage and the average monthly total water storage, to obtain an anomaly time series of the monthly GRACE-derived total water storage.

17. A computer device, comprising a memory, a processor, and computer programs stored in the memory and executable by the processor; the computer programs, when executed by the processor, cause the processor to perform the method of claim 1.

* * * * *